United States Patent Office 3,615,099
Patented Oct. 26, 1971

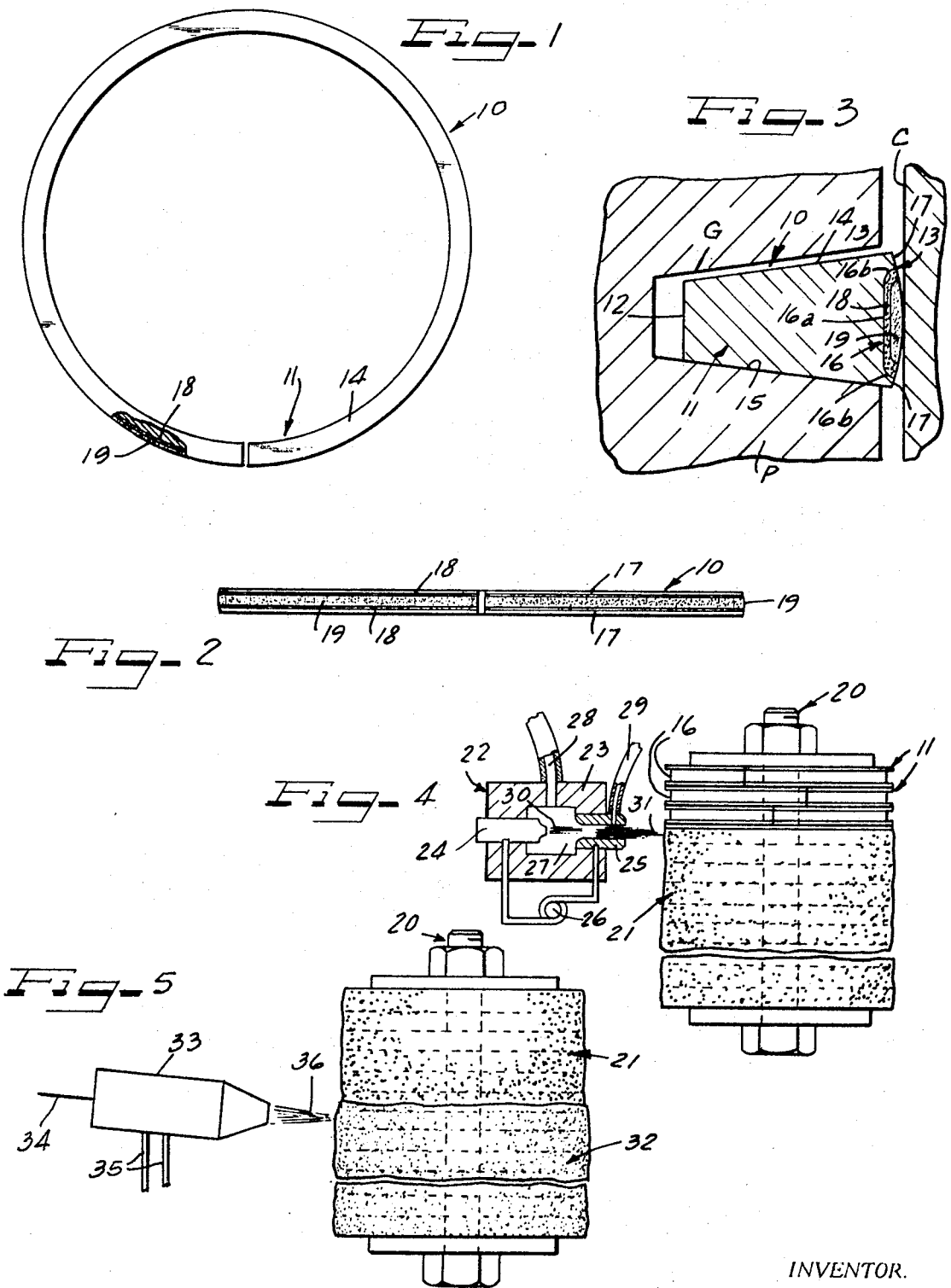

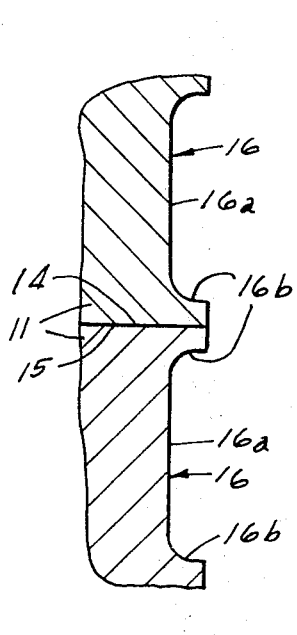
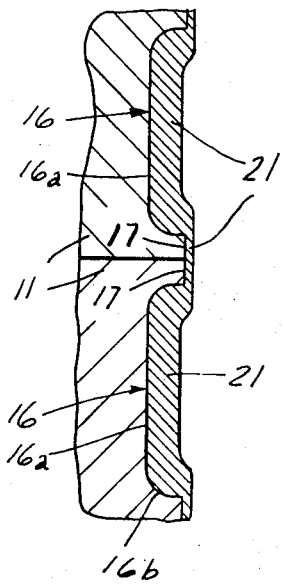
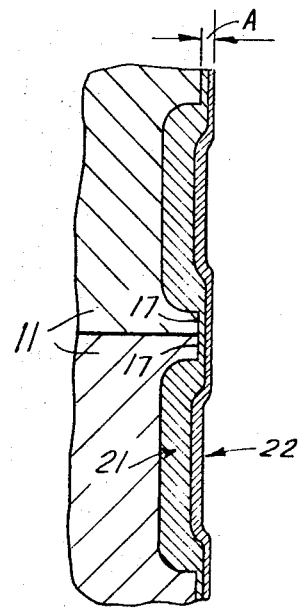
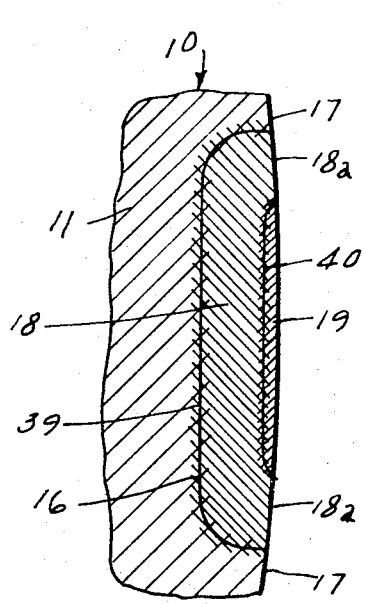
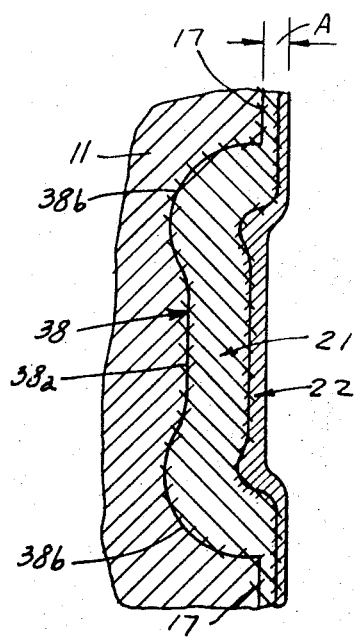

3,615,099
MULTIPLE LAYER FACED PISTON RINGS
Herbert F. Prasse, Town and Country, Mo., assignor to Ramsey Corporation, St. Louis, Mo.
Filed Feb. 26, 1969, Ser. No. 802,350
Int. Cl. F16j 9/22
U.S. Cl. 277—235 A
7 Claims

ABSTRACT OF THE DISCLOSURE

Piston rings with multi-layer hard facings composed of an outer break-in layer of refractory porous scuff resisting material, such as molybdenum, over and bonded to a more refractory, less porous material such as a tungsten carbide alloy which, in turn, is bonded to a base ring body material such as iron. The outer layer, although refractory, functions during the engine run-in period better than the underlying material because it is softer and more porous, and as it wears away and oxidizes, a more refractory less porous underlying layer comes into operation to insure long lasting highly efficient sealing of the compatible ring and cylinder surfaces formed during the break-in operation of the engine.

BACKGROUND OF THE INVENTION

Field of the invention

This invention relates to the packing ring or piston ring art and to the provision of hard facings on piston rings for increasing their efficiency and longevity. The invention particularly deals with flame spray applied and plasma jet applied multiple coatings on piston rings.

SUMMARY OF THE INVENTION

The present invention now provides hard faced piston rings with an outer layer which is hard, refractory, scuff resisting and very porous so as to act efficiently during an engine break-in period of operation. At high rubbing speeds localized high spots in the engaging surfaces between the piston ring and cylinder of the engine may cause temperatures at the ring surface to reach 1000° F. and above. The outer facing material of the rings of this invention may oxidize at these temperatures, but instead of causing catastrophic failure, as with chromium and other hard piston ring facing materials, these oxides are soft and pass out of the engine causing no damage. The porous outer layer gradually wears down to expose the underlying less porous and more refractory layer which does not have the surface oxidation property of the outer layer. However, by the time the underlying layer comes into operation, the ring and cylinder surfaces have been worn into compatible running surfaces and the localized high spots have been worn away. Thus, when the underlying layer takes over, there is no further need for the extremely porous outer layer and the more refractory less porous material will effectively seal over longer engine operating periods to thereby greatly increase the life of the engine before overhauling is needed.

The invention will be particularly described as embodied in a compression piston ring having a cast nodular iron body of about three and one-half percent carbon content by weight and with a groove therearound filled with the multiple layers of refractory material and bounded on both sides by land surfaces of the base metal. The bottom of the groove is filled with a plasma jet applied refractory metal carbide alloy efficiently bonded to the base metal. This hard facing layer is covered with a thinner surface layer of flame jet or plasma jet applied more porous and less refractory material in good bonded relation therewith.

The surface facing material is preferably molybdenum with a porosity of about twenty-five percent, an oxidation point between 700° and 1000° F. and a hardness not materially exceeding 1000 Vickers (DPN) with a 40-gram load. The underlying back-up layer is preferably a plasma jet applied tungsten carbide alloy with a porosity of around ten percent, oxidation resistant at temperatures well over 1000° F., an overall hardness far exceeding the surface facing, and a wear resistance many times greater than the surface facing layer. This underlying back-up layer is preferably a three-phase coating, having a hard phase of 2900 to 4000 Vickers (DPN), a second phase having a Vickers particle hardness of 2100 to 3200 DPN and a matrix with a Vickers particle hardness of 900 to 1200 DPN.

The plasma jet or plasma-arc method of applying the carbide coating involves application of high energy electric current through a diatomic gas such as nitrogen or hydrogen or a monatomic gas such as argon or helium to ionize the gas which creates a high energy plasma releasing heat energy to a powder composed of the alloy ingredients which are vaporized and deposited in the ring groove as an in situ formed refractory carbide alloy with the carbides in solution. Preferred refractory carbide alloys include carbides of tungsten, titanium, tantalum, columbium, molybdenum, vanadium, chromium, zirconium, hafnium, silicon, and boron. Metals such as cobalt, nickel, chromium, aluminum and boron are provided in the alloy to produce a three-phase coating with a hard phase composed of the carbides in solution in another metal, a second phase also composed of carbides in solution, but less hard than the first phase and a third phase composed of a matrix of the base metals of considerably less hardness than the first and second phases.

A typical powder composition for feeding to the plasma jet stream is as follows:

25 to 55 percent by weight tungsten carbide
4 to 8 percent by weight cobalt
25 to 45 percent by weight nickel
3 to 7 percent by weight chromium
0 to 7 percent by weight aluminum
0 to 3 percent by weight boron
Balance substantially iron.

The tungsten carbide content of the powder may be admixed with or replaced by other carbides such as the carbides of metals and metalloids from the group including titanium, tantalum, columbium, molybdenum, vanadium, chromium, zirconium, hafnium, silicon, and boron.

The surface layer is preferably applied by flame spraying from commercially pure molybdenum wire melted in oxygen-acetylene fueled guns which propel small droplets of molten molybdenum onto the initially deposited layer. The oxygen-acetylene fuel may preferably be replaced with methyl-acetylene propediene which can be controlled to maintain a good ductility in the coating.

Alternatively, the molybdenum can be applied by the plasma jet method resulting in a somewhat softer deposit.

The plasma jet applied and the flame jet applied material, upon solidification, create an interlocking bond with each other and with the base metal which is formed at the interfaces therebetween.

The molybdenum can be replaced with other refractory materials capable of being flame sprayed or plasma jet sprayed, such as aluminum trioxide, or the like.

It will be understood, of course, that this invention is not limited for use on compression type piston rings, being generally applicable for use on any packing ring installation where break-in operation followed by prolonged wear life is desired.

It is then an object of this invention to provide piston rings having multiple layers of hard facing material thereon successively effective to function in various phases of engine operation.

Another object of this invention is to provide a multilayer hard faced piston ring with an outer break-in layer composed of refractory porous oxidizable material and an underlying layer composed of non-oxidizable harder refractory material of less porosity.

A specific object of this invention is to provide an engine piston ring having an annular groove therearound filled with two layers of spray-deposited refractory metals, including a surface layer of porous molybdenum and an underlying layer of a tungsten carbide alloy.

A still further object of this invention is to provide piston rings for heavy duty engine operation having a plasma jet applied refractory coating covered by a spray deposited break-in coating.

A specific object of this invention is to provide a piston ring with a bearing face composed of two layers of refractory metal, including a thin outer layer of spray-deposited molybdenum and an underlying thicker layer of a refractory metal carbide having the carbides in solution with both layers being bonded to each other end to the ring body by mechanical interlocking and alloying at the interfaces thereof.

Other and further objects of this invention will be apparent to those skilled in this art from the following detailed description of the annexed sheets of drawings which, by way of preferred embodiments only, illustrate several examples of this invention.

BRIEF DESCRIPTION OF THE DRAWINGS

FIG. 1 is a plan view of a compression piston ring of this invention with a portion broken away to show underlying structure.

FIG. 2 is an end elevational view of the ring of FIG. 1.

FIG. 3 is a greatly enlarged fragmental view showing the ring of FIGS. 1 and 2 in a piston and cylinder assembly.

FIG. 4 is a somewhat diagrammatic view illustrating the application of the first layer of refractory material on the piston rings of this invention.

FIG. 5 is a view similar to FIG. 4, but illustrating the application of the second layer of refractory material.

FIG. 6 is an enlarged fragmentary cross sectional view illustrating adjacent grooved ring bodies for receiving the first coating.

FIG. 7 is a view similar to FIG. 6, but showing the first coating layer applied.

FIG. 8 is a view similar to FIG. 7, but showing the second coating layer applied.

FIG. 9 is a greatly enlarged fragmentary sectional view of a ring with a modified groove contour illustrating build-up of the deposited layers on the groove.

FIG. 10 is a greatly enlarged fragmentary sectional view of the face portion of a ring of this invention illustrating the bonded layers.

DESCRIPTION OF THE PREFERRED EMBODIMENTS

The ring 10 of FIGS. 1 to 3 is composed of a cast nodular iron split ring body 11 of keystone shaped cross section with a narrow cylindrical inner periphery 12 and a wider barrel-shaped outer periphery 13, together with flat sloping top and bottom side faces 14 and 15 converging from the outer periphery 13 to the inner periphery 12. The outer periphery 13 of the ring body 11 has an annular groove 16 therearound. This groove 16 has a flat bottom 16a and curved or dished ends 16b. Lands 17 are provided on the periphery 13 between the end walls 16b and the top and bottom faces 14 and 15 of the ring.

The groove 16 is filled with an inner layer 18 and an outer layer 19 of different refractory metals according to this invention. The inner layer 18 follows the contour of the groove 16 leaving a recess which receives the outer layer 19.

As illustrated in FIGS. 4 and 6, the ring bodies 11 are stacked on an arbor 20 with their side faces in tightly pressed together relation and with their peripheral grooves 16 fully exposed around the arbor.

The outer peripheries of the rings stacked in the arbor 20 are covered with a coating 21 applied from a plasma jet gun 22. The gun 22 has an insulated casing carrying a cathode 24 at the rear end thereof, an anode nozzle 25 at the front end thereof. A direct current source of electric energy 26 has the negative connection to the cathode 24 and the positive connection to the anode 25. Gas such as hydrogen, nitrogen or argon is supplied to a chamber 27 in the casing from a supply tube 28 and refractory metal powder is supplied to the nozzle outlet of the anode 25 from a tube 29. A high density arc 30 converts the gas atoms into high energy plasma having a high velocity projected through the anode to form a jet stream 31 which picks up the powder from the tube 29 and propels it to the peripheries of the stack of piston rings on the arbor. The arbor is rotated until the entire peripheral surfaces of the rings are covered, and as shown in FIG. 7, the coating 21 undulates to follow the contours of the peripheries of the rings covering the bottom 16a and sides of the groove 16 as well as the lands 17 beyond the grooves.

The preferred powder mixture fed to the inlet 29 of the gun 22 has the following composition by weight:

40% tungsten carbide
6% cobalt
36.5% nickel
6% chromium
1% boron
.5% aluminum
Balance substantially iron with minor amounts of silicon and carbon.

The preferred deposited coating 21 is a tungsten carbide alloy having a hexagonal close pack crystalline structure in a matrix composed principally of nickel and chromium. The alloy has three principal phases, the hardest phase being composed of tungsten carbide in solution with the cobalt and having a Vickers hardness of from 2900 to 4000 DPN. In this phase, the carbides are well in solution and are not sharp. The second phase is also composed of tungsten carbide and cobalt with the carbides in solution, but this phase has a particle hardness in the range of 2100 to 3200 Vickers DPN. The third phase is a matrix composed principally of nickel and chromium with boron uniformly distributed and having a Vickers hardness in the range of 900 to 1200. A fourth phase composed of a minor percent by volume contains aluminum and is softer than the third phase. The tungsten carbides in the preferred alloy consist principally of $W_2C$ and $(WCo)_2C$ and may be considered to have the following formula:

$$W_2C(WCo)_2C$$

It is desired to maintain a temperature in the grooves 16 of the stacked rings sufficiently low to prevent excessive melting and burning away of the body metal 11, and for this purpose, the arbor of rings is preferably cooled with an external blast of inert gas impinging on both sides of the jet flame. It is desired to keep the temperatures of the rings in the arbor around 400° F. or less. It is not necessary to provide any subsequent heat treatment for the plasma jet coated rings other than allowing the rings to air cool.

After the coating 21 is applied, the arbor 20 of stacked rings next receives the covering coating 32 shown in FIGS. 5 and 8. The coating 22 is applied from one or more spray guns 33 supplied with substantially pure molybdenum wire 34  and an oxyacetylene or methylacetylene propediene fuel gas from supply tubes 35. The flame spray jet or jets 36 impinges on the coating 21 and follows the contour of the coating to apply the coating 32 in the undulating shape illustrated in FIG. 8 following the contour of the coating 21. The coating 32 is much thinner than the coating 21 but covers all of the coating 21.

It will also be noted from FIG. 8 that the coating 32 does not touch the base metal 11, being always separated therefrom by the underlying coating 21.

The molybdenum coating 32 has a Vickers hardness of around 1000 DPN and a total open and closed cell porosity of fifteen to twenty-five percent. On the other hand, the underlying coating 21 is much more dense and has a total open and closed cell porosity arountd ten percent.

It will be further noted from FIGS. 7 and 8 that the portion of the coating 21 overlying the land areas 17 is very thin with the major thickness of the coating layer in the grooves 16. This not only saves coating metal, but as will be hereinafter more fully explained, eases the finishing operations. The coating 32 follows the contour of the coating 21 as shown in FIG. 8, and is preferably also thinner at the areas overlying the lands 17.

As shown in FIG. 9, a ring body 11 may have a contoured groove 38 to further conserve the hard facing metal. The groove 38 has a raised central bottom portion 38a so that the groove has a shallow central portion with deeper curved end portions 38b. This permits the coating 21 to be thinner in the main volume of the groove without sacrificing the dished contours for the groove ends which are important to prevent voids during the spraying operation. The coating 21 follows the contour of the modified groove 38 and the covering coating 32 then follows the modified contour of the coating 21. Here again, however, the areas of the coatings over the land portions 17 of the ring are quite thin.

It will, of course, be understood that the ring bodies in the stack of the arbor 20 shown in FIGS. 4 and 5 are contracted to closed ring form so that sprayed facing metal will not coat the split ends of the rings.

As illustrated in FIGS. 8 and 9, the multi-coated rings are ground to a depth indicated generally by the dimension A, thereby removing all of the facing metal over the land areas 17, exposing the body metal 11 at these land areas and also exposing the coating 21 in the ends of the grooves immediately adjacent these land areas. The grinding operation is facilitated because most of it deals with the removal of the softer outer coating 22 and only the relatively thin areas of the harder coating 21 overlying the lands 17 need be removed by grinding.

The finished ring, as shown in FIGS. 3 to 10, thus has the underlying hard face 18 firmly bonded to the body 11 in the groove 16 as illustrated along the interface 39. The outer hard facing layer 19 is embedded in the central portion of the layer 18 and is bonded thereto along an interface designated at 40. The layer 18 is only exposed at 18a adjacent the lands 17, but as shown in FIG. 3, these exposed portions do not contact the cylinder wall C when the piston ring is mounted in the ring groove G of the piston P due to the barrel-shaped contour of the ring periphery 13.

In operation, the ring 10 is circumferentially contracted in the cylinder C to close the free-state gap at its split ends as shown in FIGS. 1 and 2 so that its outer periphery will seal against the cylinder wall at a major diameter of its barreled surface, thereby engaging the outer layer 19 with this cylinder wall to form a seal while the bottom face 15 of the ring engages the bottom face of the ring groove G to effect the sealing between the ring and piston.

In the finished ring 10, shown in FIGS. 3 to 10, the inner layer 18 has a radial thickness of about .004 to .008 inch, while the outer layer 19 is much thinner having a thickness of about .001 to .004.

During the wear-in or break-in period of operation of an engine equipped with rings 10 of this invention, the layer 19 engaging the cylinder wall C is highly porous, as explained above, and is saturated with oil. The molybdenum forming this porous layer has the best scuff-resisting properties of any known material and this coupled with the lubricant filled pores gives the ultimate protection against scuffing during the first ten percent of the life of the ring during which the ring surfaces and cylinder wall surfaces become thoroughly mated and compatible. During this break-in period, the molybdenum may oxidize and wear away, but the oxides smoothly pass out of the engine without damage to any of the parts. Then, as the thin molybdenum covering coat is gradually worn away, the carbide coat becomes the engaging surface and seal against the cylinder wall. By this time, the high lubricant carrying capacity is not needed, and the compatible mated together surfaces are freed of high spots which might cause localized high temperatures so that the harder, more refractory, carbide coating provides the better wearing seal for the remainder of the engine life.

From the above descriptions, it will, therefore, be understood that this invention provides a piston ring affording the best known scoff resistance during the first part of its life and the greatest protection against wear for the remainder of its life.

Although various minor modifications might be suggested by those versed in the art, it should be understood that I wish to embody within the scope of the patent warranted hereon all such modifications as reasonably and properly come within the scope of my contribution to the art.

I claim as my invention:

1. A sealing piston ring consisting of a ferrous metal ring body and a multi-layer bearing face on said body having a first layer of refractory metal carbide bonded to the body selected from the group consisting of carbides of tungsten, titanium, tantalum, columbium, molybdenum, vanadium, chromium, zirconium, hafnium, silicon, and boron, and a second layer of less refractory scuff-resisting porous metal overlying and bonded to the first layer selected from the group consisting of molybdenum and aluminum trioxide, said second layer having a thickness of about .001 to .004 inch and wearing away during a break-in period of operation to expose the first layer for forming the bearing face of the piston ring.

2. An engine piston ring having a multi-layer facing consisting of a sealing ring of base metal, a metallic layer of a metal carbide selected from the group consisting of carbides of tungsten, titanium, tantalum, columbium, molybdenum, vanadium, chromium, zirconium, hafnium, silicon and boron on the outer periphery of the sealing ring, and an overlying porous metallic scuff resisting break-in layer of greater porosity and less heat resistance than the underlying layer, said break-in layer being relatively thin and wearing away during break-in operation of the engine to expose the underlying layer as the active bearing face.

3. The piston ring of claim 2 wherein the refractory carbide layer is a multiple phase alloy having a hard phase of carbides in solution in a matrix of lesser hardness.

4. A compression ring for internal combustion engine pistons consisting of a sealing cast iron ring body having an outer peripheral groove therearound, a first layer of a metal carbide in said groove bonded to said iron body and selected from the group consisting of carbides of tungsten, titanium, tantalum, columbium, molybdenum, vanadium, chromium, zirconium, halfnium, silicon and boron, a second layer overlying and bonded to said first layer selected from the group consisting of molybdenum and aluminum oxide, the outer periphery of said ring having land areas of cast iron on each side of the groove, exposed areas of said first layer adjacent the land areas and a major bearing wall projecting radially outward from said land areas and exposed areas composed of said second layer material to form the initial contacting surface between the ring and a cylinder in which the piston operates, said second layer being thin relative to said first layer and wearing away to permit the exposed areas of the first layer to engage the cylinder.

5. A piston ring for internal combustion engine pistons consisting of a sealing base metal body having an outer peripheral wear face for sequential sealing engagement with a cylinder in which the piston operates said wear face consisting of a layer of porous scuff-resisting metal with a total open and closed cell porosity of 15 to 25% and oxidizing at temperatures between 700 and 1000° F. and an underlying less porous layer of refractory carbide selected from the group consisting of carbides of tungsten, titanium, tantalum, columbium, molybdenum, vanadium, chromium, zirconium, halfnium, silicon and boron, said overlying layer being thin relative to said underlying layer and wearing away during a break-in period of operation of the engine to permit the underlying layer to become the bearing face for the ring.

6. A composite scuff and wear resistant sealing piston ring body of base metal having a facing on the outer periphery thereof consisting of an inner peripheral band of plasma jet applied tungsten carbide alloy and an overlying outer band of flame sprayed porous molybdenum, said bands being intimately bonded to each other and to the ring body.

7. An engine seal having a multi-layer facing with an outer layer of porous molybdenum having a total open and closed cell porosity of 15–25% and an underlying less porous and more refractory layer composed of $$W_2C_1(WCo)_2C$$

in solution with cobalt in a matrix of principally nickel and chromium.

References Cited
UNITED STATES PATENTS

| | | | |
|---|---|---|---|
| 2,589,107 | 3/1952 | Marien | 277—235 A |
| 2,905,512 | 9/1959 | Anderson | 29—156.6 |
| 3,054,694 | 9/1962 | Aves | 117—71 M |

FOREIGN PATENTS

| | | | |
|---|---|---|---|
| 930,089 | 7/1963 | Great Britain | 277—235 A |

ROBERT J. SMITH, Primary Examiner